W. J. PETERSON.
METHOD OF DECORATING GLASS.
APPLICATION FILED DEC. 28, 1908.

934,094.

Patented Sept. 14, 1909.

Witnesses:

Inventor
William J. Peterson
By his Attorney

UNITED STATES PATENT OFFICE.

WILLIAM J. PETERSON, OF NEW YORK, N. Y.

METHOD OF DECORATING GLASS.

934,094.
Specification of Letters Patent.
Patented Sept. 14, 1909.

Application filed December 28, 1908. Serial No. 469,628.

*To all whom it may concern:*

Be it known that I, WILLIAM J. PETERSON, a citizen of the United States, and a resident of New York city, Brooklyn, county of Kings, State of New York, have invented new and useful Improvements in Methods of Decorating Glass, of which the following is a specification.

This invention relates to a novel method of decorating glass, used more particularly for the bent glass panels of lamp shades or globes, and light fixtures generally. By my invention the glass may be decorated with complex multi-colored patterns in a simple manner, without leading, so that its ornamentation is simplified and a superior product is obtained.

Figure 1:
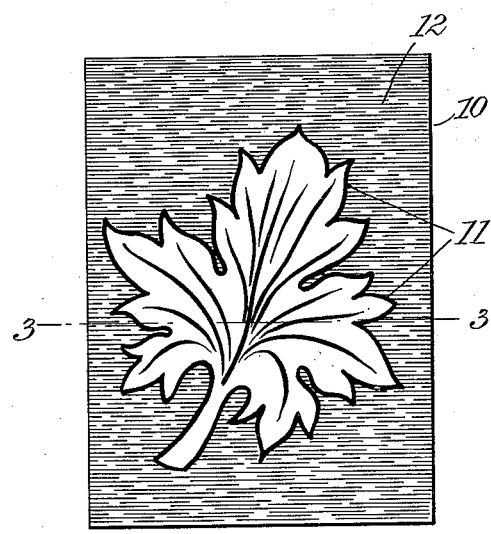
Figure 2:
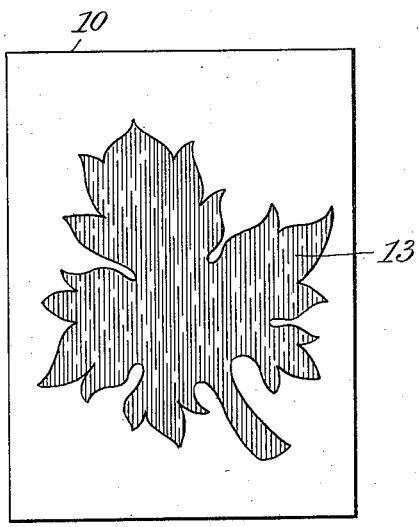
Figure 3:
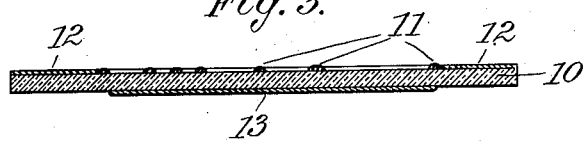
Figure 4:
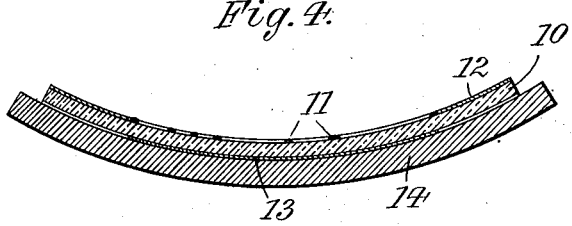

In the accompanying drawing: Figure 1 is a back view of a plate of glass decorated according to my improved method, showing it before bending; Fig. 2 is a similar front view thereof; Fig. 3 a cross section on line 3—3, Fig. 1, and Fig. 4 a cross section of the complete decorated and bent glass, showing the mold.

In carrying out the invention I take a straight transparent plate of glass 10, cut to any desired shape. Upon the back of this plate there is applied by stencil or hand, the outline 11 of any suitable ornamental pattern. This outline is formed in a heavy line by a mineral oil color. Next the back is covered with a white enamel layer 12 which is applied to the field outside of pattern 11. This enamel is preferably first brushed over the entire back, and is then removed from within the spaces defined by the pattern line. After the back of plate 10 has been treated as described, the plate is reversed and the spaces inclosed within the pattern are filled in on front with a mineral color 13. This color may be readily placed, as the outline 11 is clearly observable through the transparent body of the glass. The mineral color 13 may be imposed in varying thickness to render the pattern more or less opaque at different places and thus obtain variations in the shading. The plate 10, prepared as described, is placed straight across a mold 14 having the contour to be imparted to the finished article. The plate is so placed upon the mold that the side stained with the mineral color 13 faces downward. The mold thus topped is placed into the kiln, where it is fired. The firing of the plate will cause it to gradually bend, so that its lower surface becomes gradually bulged and expanded until it rests upon the bottom of the mold. As this bending proceeds, the mineral stain 13, on the bottom of the plate, will be spread or disseminated over its expanded surface and will be baked while being so spread. The result is that a beautiful irregular shading or iridescent effect is imparted to the plate. After the firing is completed, the glass is cooled to finish the operation.

It will be seen that by my invention ornamental patterns of various designs may be readily applied to glass in a simple, quick and durable manner. The dark contour on the back of the glass will form a mellow outline for the body of the pattern on the front of the glass, while the inner enamel coating not only furnishes a pleasing background, but also constitutes a reflector for throwing the light downward.

I claim:

1. Process of decorating glass which consists in applying to the back of a straight plate of glass the outline of a pattern, then applying to its face a mineral stain within said outline, then placing the plate face downward upon a mold, and then firing the plate, whereby the plate is caused to sag and its stained face to become expanded.

2. Process of decorating glass which consists in applying to the back of a straight plate of glass the outline of a pattern, then covering the field on said back with an enamel coating, then applying to the face of the plate a mineral stain within said outline, then placing the plate face downward upon a mold, and then firing the plate, whereby the plate is caused to sag and its stained face to become expanded.

Signed by me at New York city, (Manhattan,) N. Y., this 26th day of December, 1908.

WILLIAM J. PETERSON.

Witnesses:
W. R. SCHULZ,
FRANK V. BRIESEN.